United States Patent [19]

Cox et al.

[11] 4,120,505
[45] Oct. 17, 1978

[54] STABILIZING BACKING PLATE FOR A FLEXIBLE DISK STORE

[75] Inventors: Allen Ronald Cox; Michael Robert Hatchett; Leonard John Rigbey, all of Tucson, Ariz.

[73] Assignee: International Business Machines Corporation, Armonk, N.Y.

[21] Appl. No.: 815,394

[22] Filed: Jul. 13, 1977

[51] Int. Cl.² .............................................. G11B 3/60
[52] U.S. Cl. ................................. 274/39 R; 358/128; 360/102
[58] Field of Search ........................... 274/39 R, 39 A; 179/100.3 V; 358/128; 360/99, 102

[56] References Cited

U.S. PATENT DOCUMENTS

| 1,347,113 | 7/1920 | Merriam | 274/39 R |
|---|---|---|---|
| 3,225,338 | 12/1965 | Kelner et al. | 360/99 |
| 3,830,506 | 8/1974 | Ewert et al. | 274/39 A |
| 3,863,266 | 1/1975 | Hoshino | 360/99 X |

Primary Examiner—Charles E. Phillips
Attorney, Agent, or Firm—Herbert F. Somermeyer

[57] ABSTRACT

A stabilizing backing plate for a rotating flexible record disk has a bearing surface with a smooth finish to prevent disk wear. A plurality of depressions in the backing plate trap air to prevent the flexible disk from adhering to the backing plate during start-up.

11 Claims, 3 Drawing Figures

STABILIZING BACKING PLATE FOR A FLEXIBLE DISK STORE

DOCUMENT INCORPORATED BY REFERENCE

Commonly assigned co-pending application Hatchett et al, Ser. No. 775,233, filed Mar. 7, 1977 now abandoned shows another backing plate.

BACKGROUND OF THE INVENTION

The invention relates to recording and/or reproducing apparatus, and in particular to apparatus of the type in which a disk-shaped flexible recording medium is mounted for rotation above a stationary stabilizing backing plate and, in operation, is supported by an air bearing produced by the flow of air between the rotating medium and a bearing surface of the backing plate.

When not in use the flexible disk lies at rest in contact with the backing plate. Accordingly, during start/stop operations there is a period before the air bearing is fully established during which time the disk is moving with its surface in contact with the backing plate. This can cause various problems depending upon the nature of the surface of the backing plate.

For example, if the backing plate is provided with a roughened sand or grit blasted surface as is often done to trap air between it and the disk in order to facilitate the establishment of an air bearing during start-up, then the contacting surface of the disk can and often does suffer from wear problems. The surface finish of a plate treated in this way is extremely difficult to control and even changes from plate to plate as the grit size changes during the blasting operation. Furthermore, pieces of grit can become impounded in the surface of the backing plate and although the average peak-to-peak surface finish is around 60–65 microinches, local peak-to-peak irregularities can be in excess of 100 microinches. Thus, in addition to the general wear of the disk surface these localized asperities produce quite deep scratches which, if this surface is used for recording and for reproducing operations, can cause errors.

If at the other extreme the backing plate is polished to a mirror-like finish, then the absence of trapped air causes the disk to strongly adhere to the surface of the backing plate. This phenomenon is known as "wringing" and the forces involved can be large enough to prevent a small drive motor even from starting to rotate the disk. If the motor is powerful enough to overcome the forces then distortion of the disk can still occur which adversely affect the subsequent operation of the apparatus.

Between these two extremes there are varying degrees of surface roughness which can be selected to trade-off the problem of "wringing" associated with a smooth plate against the problem of wear associated with a rough plate. This invention seeks to provide a backing plate with a surface finish which has the advantages of the two extremes but does not suffer from the disadvantages.

SUMMARY OF THE INVENTION

In recording and/or reproducing apparatus of the type described, a stabilizing backing plate according to the invention in which a bearing surface is provided by treating a face of the plate to form a plurality of spaced depressions distributed thereover in a predetermined pattern separated by portions of untreated face.

In a preferred embodiment of the invention, a regular array of identical depressions are provided over one face of a backing plate by a photolithographic and etching technique. In one exemplary form each depression has a diameter of 0.7 mm and a nominal depth of 0.2 mm. The depressions are distributed over the face of the backing plate in a regular grid pattern having a rectangular pitch of 1 mm. This distribution density results in about 40% of the plate area being removed by the etching process.

Any suitable procedure may be employed for altering the surface; for example, impact detenting, electrodischarge machining and the like are alternate suitable methods for forming depressions in a surface for producing an article employing the present invention.

The foregoing and other objects, features, and advantages of the invention will be apparent from the following more particular description of preferred embodiments of the invention, as illustrated in the accompanying drawings.

THE DRAWINGS

DETAILED DESCRIPTION

Referring now more particularly to the appended drawings, like numerals indicate like parts and structural features in the various views.

Figure 1:
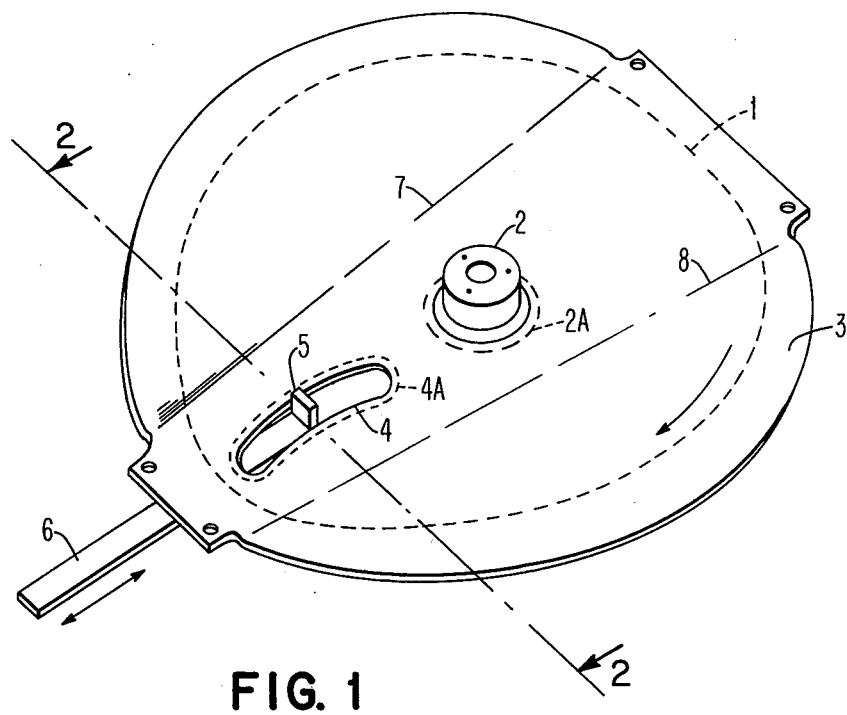
FIG. 1 is a diagrammatic showing of a backing plate for a flexible disk apparatus which can advantageously employ the present invention and be enhanced thereby.
Figure 2:
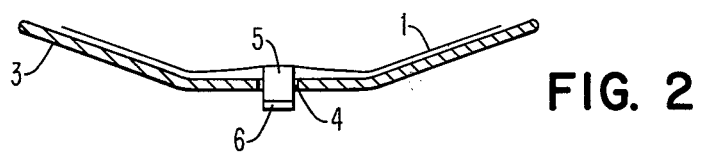
FIG. 2 is a cross-section view of the FIG. 1 illustrated apparatus taken in the direction of the arrows along line A—A.

FIGS. 1 and 2 show data storage apparatus incorporating a backing plate 3 bent to provide a concave flying surface. The illustrated apparatus consists of a 6 inch flexible disk 1 (shown dotted in FIG. 1) mounted on a spindle 2 for rotation over and in close proximity to rigid backing plate 3. A radially aligned longitudinal slot 4 permits access to the underside of the disk by a recording/playback head 5 mounted on a radially movable support arm 6. The backing plate 3 is bent towards the disk along two chordal lines 7 and 8 so as to produce corresponding bends in the disk 1 along the two chordal lines 7 and 8. The bends 7, 8 result in a flat web portion therebetween which circumscribes the recording location represented by slot 4 and the hub on spindle 2. The bends 7 and 8 in the plate 3 are disposed one on each side of a diametral line (not shown) passing through slot 4 and the axis of rotation of the disk 1, viz., spindle 2. Such apparatus is shown in Hatchett et al, supra. The slot 4 can have a curve for accommodating a swing arm head support rather than the illustrated radially movable head support.

When starting to rotate disk 1, the disk 1 tries to flatten but is prevented from doing so by the contoured plate 3. At this time a problem of disk wear due to contact with a roughly surfaced backing plate is increased. The problem is particularly serious in this case because the disk 1 surface facing the backing plate 3 is the one used for data recording and/or reproducing operations. The wear problem is obviated by using a backing plate 3 having a bearing or disk facing surface constructed in accordance with the present invention.

The depressions 1A can span or reside in the chordal bends 7, 8. No disadvantages have been found just bending a treated plate without considering the orientation of the depressions with respect to the chordal bends. The depressions 1A should not break out into the head slot 4 nor the inner periphery of the plate. This avoids sharp edges which could damage the disk. In production, a multiple press tool may form the plate while leaving a blank or smooth border around slot 4 and around 2 as at 4A and 2A, respectively.

On the other hand, it is not necessary for the depressions to be restricted to lie within the periphery of the disk and they may extend right up to the peripheral edge of plate 3.

Figure 3:
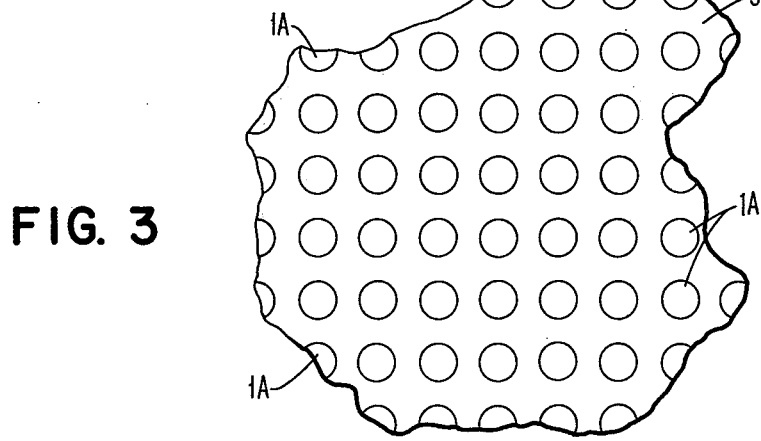
FIG. 3 is an enlarged diagrammatic plan view of a portion of the disk facing surface of the FIG. 1 illustrated apparatus.

In accordance with a preferred method of the present invention, the starting material for the backing plate 3 is a sheet of rolled NS4 aluminum alloy having a thickness of 1.5 mm. The plate is cleaned, degreased and deoxidized using well known commercially available processes. Since aluminum oxidizes readily when exposed to the atmosphere, the surfaces of the plate 3 are usually protected by a commercially available chromating process, such as for example the ICI Alochrome process. A dry film photoresist, such as Riston film supplied by duPont de Nemours is laminated on both sides of the plate and the exposed edges protected with a coating of a proprietary stop-off plating lacquer. The photoresist is then exposed through a mask in a regular matrix dot pattern constructed to achieve a pattern such as shown in FIG. 3, to define the size and location of the depressions ultimately to be formed in the disk facing surface of plate 3. It is preferred the depressions ultimately have a nominal diameter of 0.7 mm with an approximate depth of 0.2 mm. In the case of the Riston film, a protective layer of Mylar (Trademark of duPont de Nemours) is provided over the photoresist to facilitate the lamination process. This protective layer is removed from the exposed photoresist which is developed, washed and dried in the usual way. The Mylar coating is left as added protection for the resist on the other side of the plate 3, the side facing away from disk 1. The disk facing side of the plate 3 coated with the unprotected developed photoresist defining the depressions is spray etched in a solution of ferric chloride containing not less than 3% hydrochloric acid at room temperature (approximately 20° C.) for 12 minutes. If after washing and drying unwanted debris is found in the etched depressions then this may be cleaned out, for example by lightly sand blasting before the protective resist is removed. The depressions may also be rechromated before the resist is removed. The resist is then removed from the etched plate with acetone. Finally, the treated surface may be given a light burnishing or polishing to smooth off any discontinuities which may exist between the untreated surface of the plate and the etched depressions 3A.

Although the invention is particularly suited for use in the apparatus described in Hatchett et al, supra, it is also useful in apparatus with differently contoured or flat backing plates. There are also alternatives to the preferred method of treating the plate by a photolithographic and etching process which are intended to be included within the scope of the present invention. These alternatives include producing the depressions by an indenting tool in a machine press, conventional machining, by electrodischarge machining, as well as any other suitable procedures. The entire backing plate may be stamped from sheet stock with the described depressions formed in such stamping operation. Surface finishing may smooth the plate subsequent to the stamping operation.

While the invention has been particularly shown and described with reference to preferred embodiments thereof, it will be understood by those skilled in the art that various changes in form and details may be made therein without departing from the spirit and scope of the invention.

What is claimed is:

1. For use in a recording and/or reproducing apparatus wherein a record disc rotates over a stationary backing plate, the improvement being a stabilizing backing plate on which a bearing surface is provided, a face of the plate provided with a plurality of spaced depressions distributed over the face in a regular grid pattern and separated by portions of untreated plate whereby air entrapped in said depressions enhances start-up of rotation of a record disk which is adjacent said plate and covering said depressions.

2. A plate as claimed in claim 1, in which the grid pattern has a rectangular pitch.

3. A plate as claimed in claim 1, in which the area of the untreated portions of the bearing surface exceeds the area of the depressions portion.

4. A plate as claimed in claim 1, in which each said depression is substantially circular having a diameter of 0.7 mm and a nominal depth of 0.2 mm.

5. A plate as claimed in claim 1, in which said spaced depressions do not exceed 40% of the total area of the bearing surface.

6. A plate as claimed in claim 1, wherein said plate has an aperture for receiving a transducer means and a band of untreated surface encircling said aperture.

7. A plate as claimed in claim 1, wherein said plate has a flat web portion in a first axial plane and another portion abutting said web portion disposed in a plane to one side of and in other than said axial plane such that a generally concave surface faces a first direction.

8. A record storage apparatus including the plate as claimed in claim 7, further including;
   a flexible signal record disk mounted in juxtaposition to said concave facing surface for rotation thereover about an axis of rotation and in a path conforming to said plate, and
   said web portion having an elongated aperture for receiving a transducer mounted for radial motions for transducing operations with respect to said signal record disk.

9. The flexible record disk signal storage apparatus set forth in claim 8 wherein said web portion has circumferential extents which are terminated along a pair of chordal lines, respectively on opposite circumferential extremeties thereof and said web portion extending radially from a periphery of said record storage disk to said axis of rotation and said depressions being disposed on both said web portion and said other portions.

10. The flexible record disk signal storage apparatus set forth in claim 9 wherein an untreated portion includes said elongated aperture.

11. A record storage disk assembly, including in combination;
   a flexible record disk having an axis of rotation,
   a backing plate having a plurality of depressions opening toward said flexible record disk and having a web portion and being bent along at least one chordal line of said disk, said chordal line being adjacent to said web portion, and
   said web portion extending transversely to said axis of rotation.

* * * * *